(12) United States Patent
Guvenc et al.

(10) Patent No.: US 8,428,602 B2
(45) Date of Patent: Apr. 23, 2013

(54) METHODS FOR ENHANCING PERFORMANCE OF OPEN-ACCESS AND CLOSED-ACCESS FEMTOCELLS

(75) Inventors: Ismail Guvenc, Santa Clara, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 204 days.

(21) Appl. No.: 12/901,341

(22) Filed: Oct. 8, 2010

(65) Prior Publication Data

US 2011/0086641 A1     Apr. 14, 2011

Related U.S. Application Data

(60) Provisional application No. 61/251,431, filed on Oct. 14, 2009.

(51) Int. Cl.
*H04W 36/00* (2009.01)

(52) U.S. Cl.
USPC .................. 455/444; 370/331; 455/552.1

(58) Field of Classification Search .......... 455/436–444, 455/450, 452.2, 453; 370/329–336
See application file for complete search history.

(56) References Cited

U.S. PATENT DOCUMENTS

| | | | | |
|---|---|---|---|---|
| 2003/0109257 | A1* | 6/2003 | Nilsson et al. | 455/436 |
| 2007/0054667 | A1* | 3/2007 | Lee et al. | 455/434 |
| 2010/0061343 | A1* | 3/2010 | Kazmi et al. | 370/332 |
| 2010/0278141 | A1* | 11/2010 | Choi-Grogan et al. | 370/331 |

OTHER PUBLICATIONS

I. Demirdogen, I. Guvenc, H. Arslan, "A Simulation Study of Performance Trade-offs in Open Access Femtocell Networks," to appear in IEEE Indoor Outdoor Femtocells (IOFC) Workshop (co-located with PIMRC 2010), Istanbul, Turkey, Sep. 2010.

I. Demirdogen, I. Guvenc, and H. Arslan, "Capacity of Closed-Access Femtocell Networks with Dynamic Spectrum Reuse," to appear in IEEE PIMRC 2010, Istanbul, Turkey, Sep. 2010.

(Continued)

*Primary Examiner* — Vladimir Magloire
(74) *Attorney, Agent, or Firm* — Haynes and Boone, LLP

(57) ABSTRACT

In a system including one or more femtocells within a service area of a macrocell, a method includes: (a) receiving from a base station of each femtocell information regarding available resources at the femtocell; (b) measuring an signal-interference-to-noise ratio (SINR) at a mobile station relative to the macrocell and each femtocell; and (c) selecting for the mobile station one of the femtocells for a hand-off, wherein the femtostation is selected based on the combined capacity of the macrocell and the femtocells after the hand-off. When a hand-off to a femtocell is not allowed, a method for determining whether or not a spectral resource of the macrocell is reused includes (a) receiving from a base station of the macrocell a first set of spectrum-sensing data, the first set of spectrum-sensing data comprising spectrum-sensing data of mobile station of the macrocell; (b) receiving from one or more mobile stations associated with the femtocells a second said of spectrum-sensing data; and (c) based on the first set of the spectrum-sensing data and the second set of spectrum-sensing data, determining whether or not to reuse in a femtocell a portion of a spectrum used by the macrocell. The determining step may be carried out at a base station of a femtocell, and the method further requires sensing a spectrum at the base station of the femtocell to obtain a third set of spectrum-sensing data, which is also used in determining whether or not to reuse the portion of the spectrum used by the macrocell.

17 Claims, 12 Drawing Sheets

OTHER PUBLICATIONS

H. A. Mahmoud, I. Guvenc, and F. Watanabe, "Performance of Open Access Femtocell Networks with Different Cell-Selection Methods", in Proc. IEEE VTC 2010, Taipei, Taiwan, May 2010.

K. Y. Lin, H. P. Lin, and R. T. Juang, "Proposed text for HO from femtocell BS to macro BS or other femtocell BS (AWD-femto)," IEEE Standard Contribution C802.16m-09/1307, Jul. 2009.

"3rd Generation Partnership Project; Technical Specification Group Radio Access Networks; 3G Home NodeB Study Item Technical Report (Release 8)," 3GPP, 3GPP TR 25.820, Mar. 2008.

S. Huan, K. Linling, and L. Jianhua, "Interference avoidance scheme in the 802.16m femto cell environments," IEEE Standard Contribution C802.16m-09/0009, Jan. 2009.

H. Mahmoud and I. Guvenc, "A comparative study of different deployment modes for femtocell networks," in *Proc. First IEEE Int. Workshop on Indoor and Outdoor Femto Cells (IOFC), in conjunction with IEEE PIMRC* 2009, Tokyo, Japan, Sep. 2009.

H. Claussen, "Performance of macro—and co-channel femtocells in a hierarchical cell structure," in *Proc. IEEE Int. Symp. Personal, Indoor, Mobile Radio Commun. (PIMRC)*, Athens, Greece, Sep. 2007, pp. 1-5.

D. L. Perez, A. Valcarce, G. D. L. Roche, E. Liu, and J. Zhang;, "Access methods to WiMAX femtocells: A downlink system-level case study," in *Proc. IEEE Int. Conf. Commun. Syst. (ICCS)*, Guangzhou, China, Nov. 2008, pp. 1657-1662.

S. P. Yeh, S. Talwar, S. C. Lee, and H. Kim, "WiMAX femtocells: a perspective on network architecture, capacity, and coverage," *IEEE Commun. Mag.*, vol. 46, No. 10, pp. 58-65, Oct. 2008.

FemtoForum, "Interference management in UMTS femtocells," White Paper, Dec. 2008. [Online]. Available: http://www.femtoforum.org/femto/Files/File/Interference Management in UMTS Femtocells.pdf.

* cited by examiner

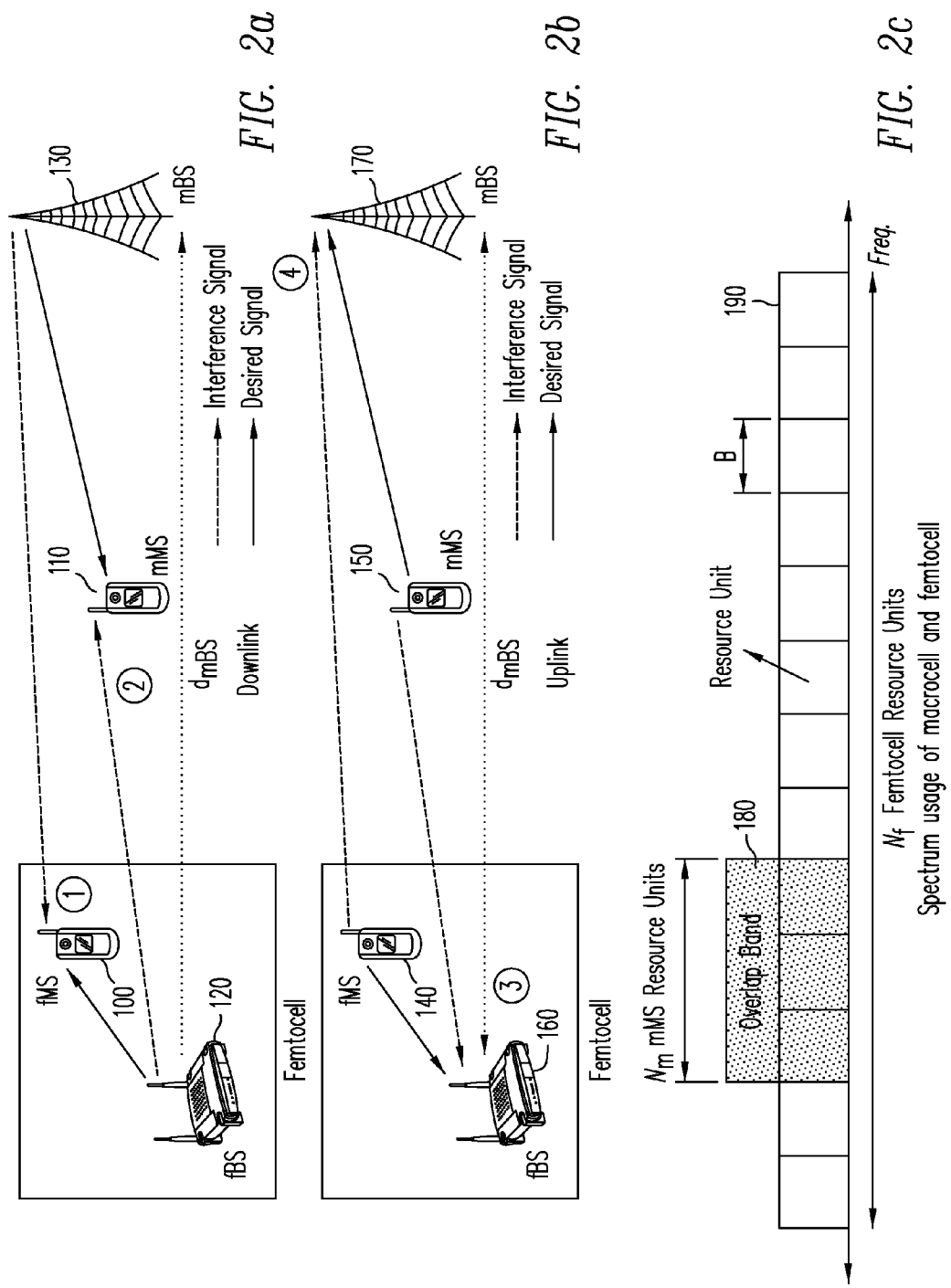

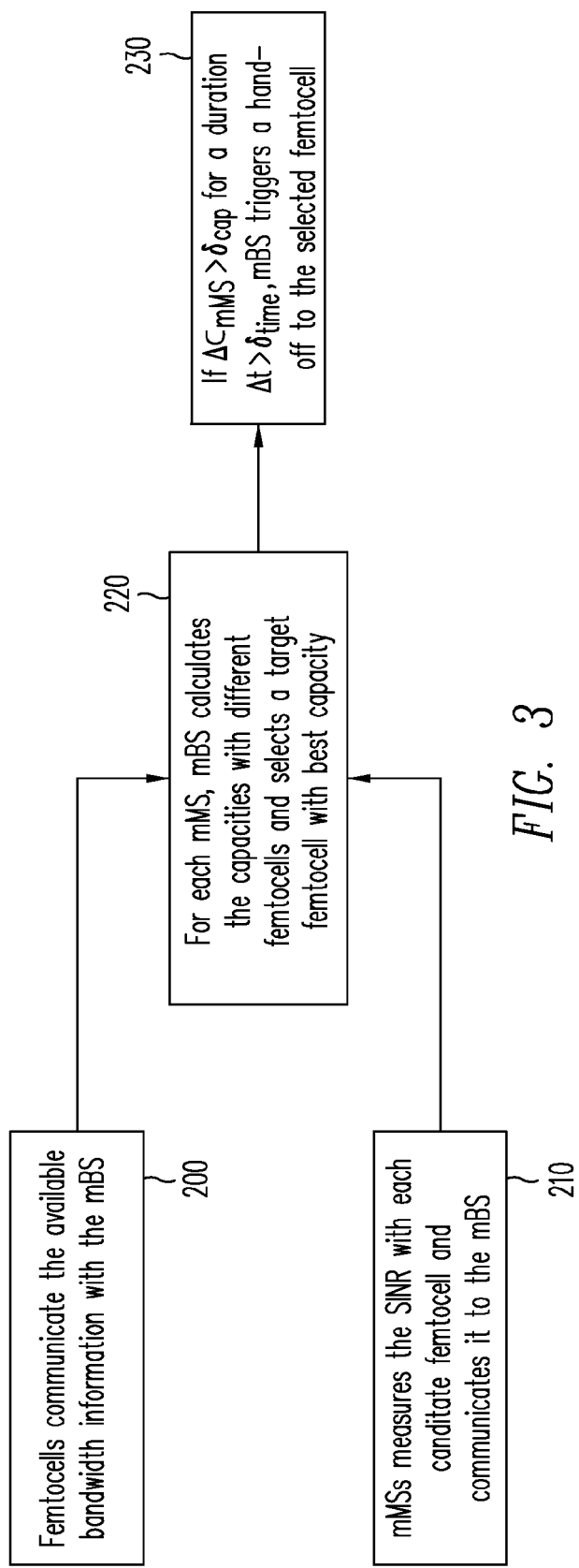
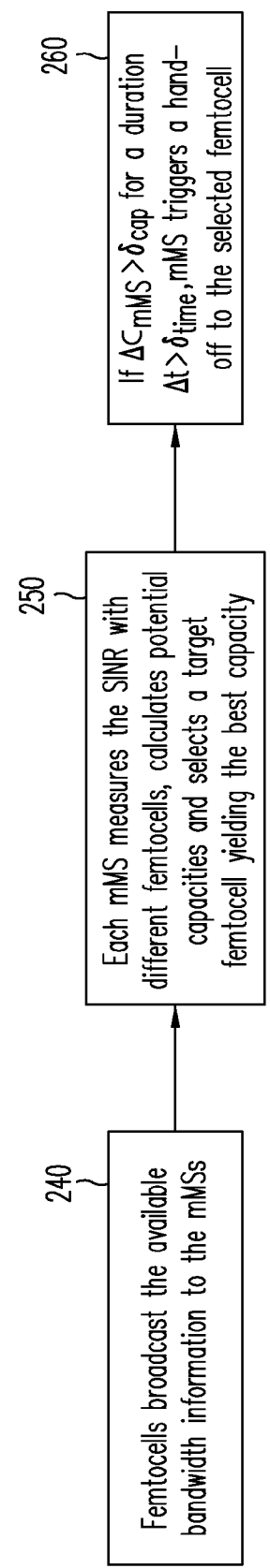

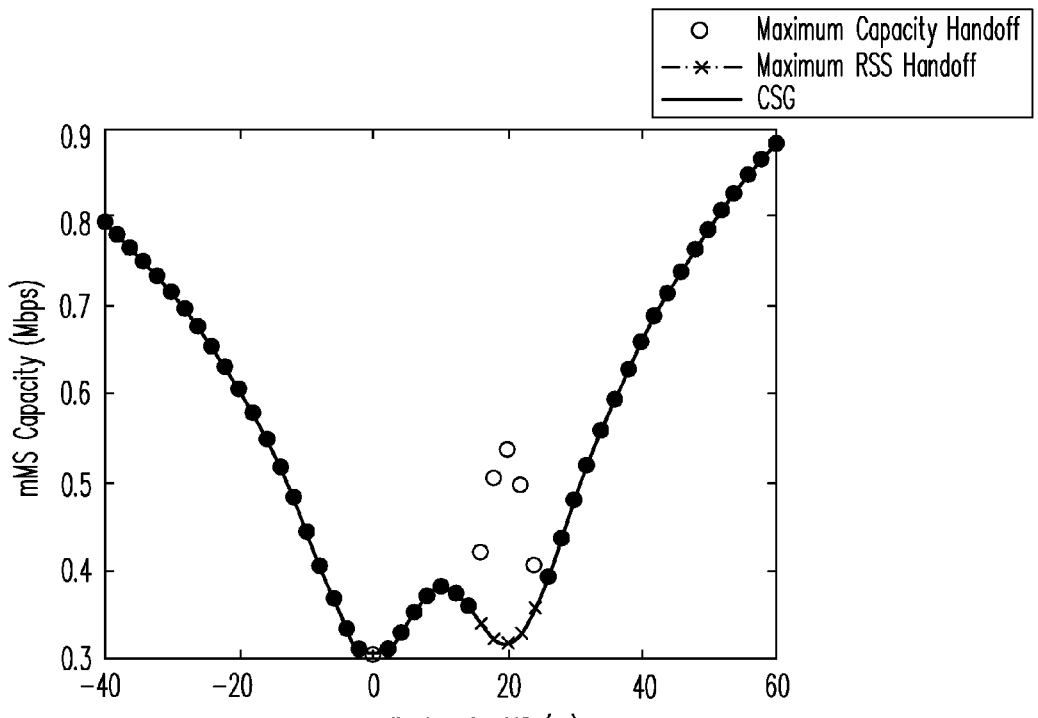
FIG. 11a  $d_{mBS}$ = 300 m.
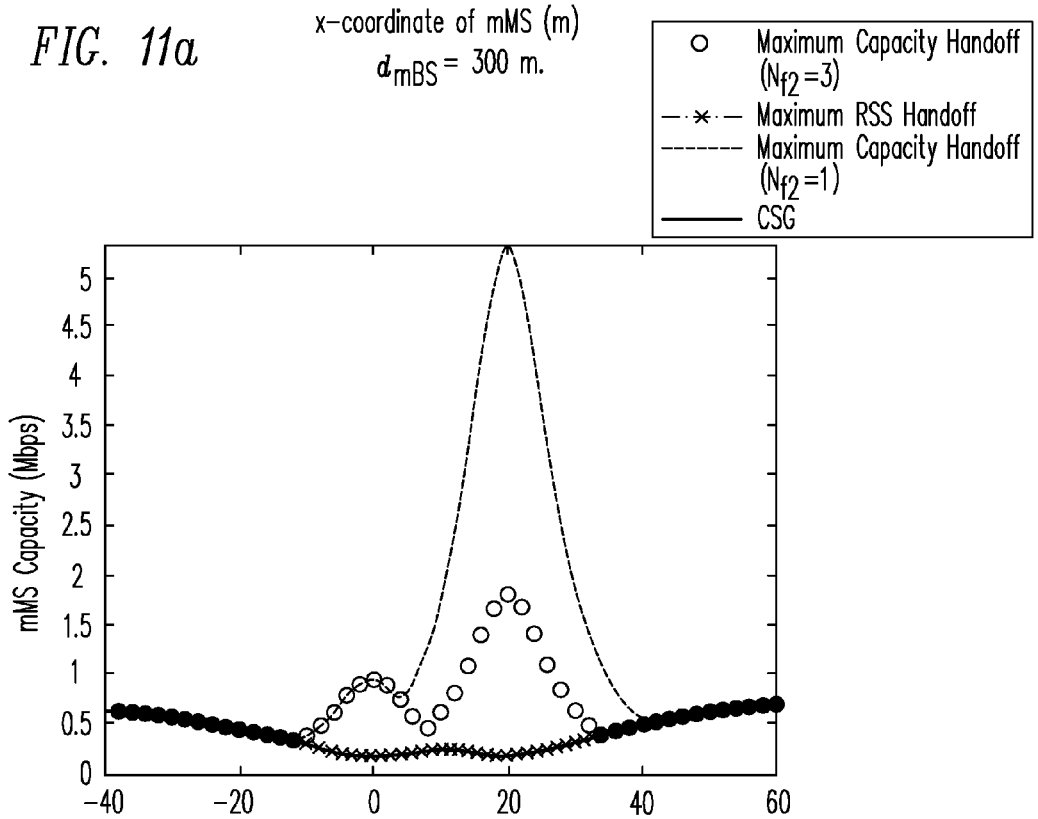
FIG. 11b  $d_{mBS}$ = 500 m.

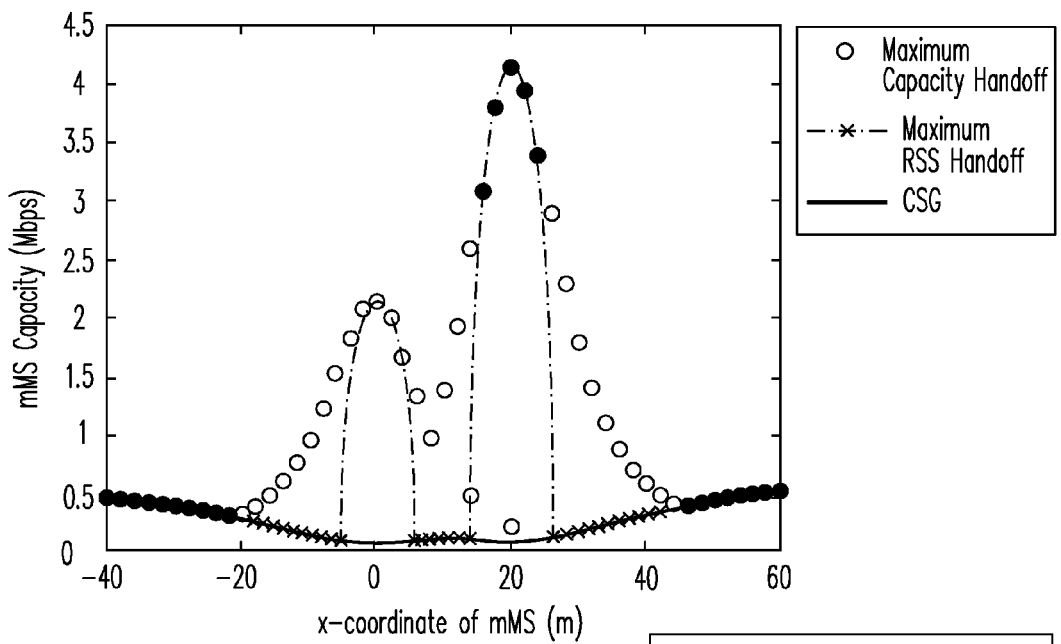
FIG. 11c  $d_{mBS}$ = 800 m.
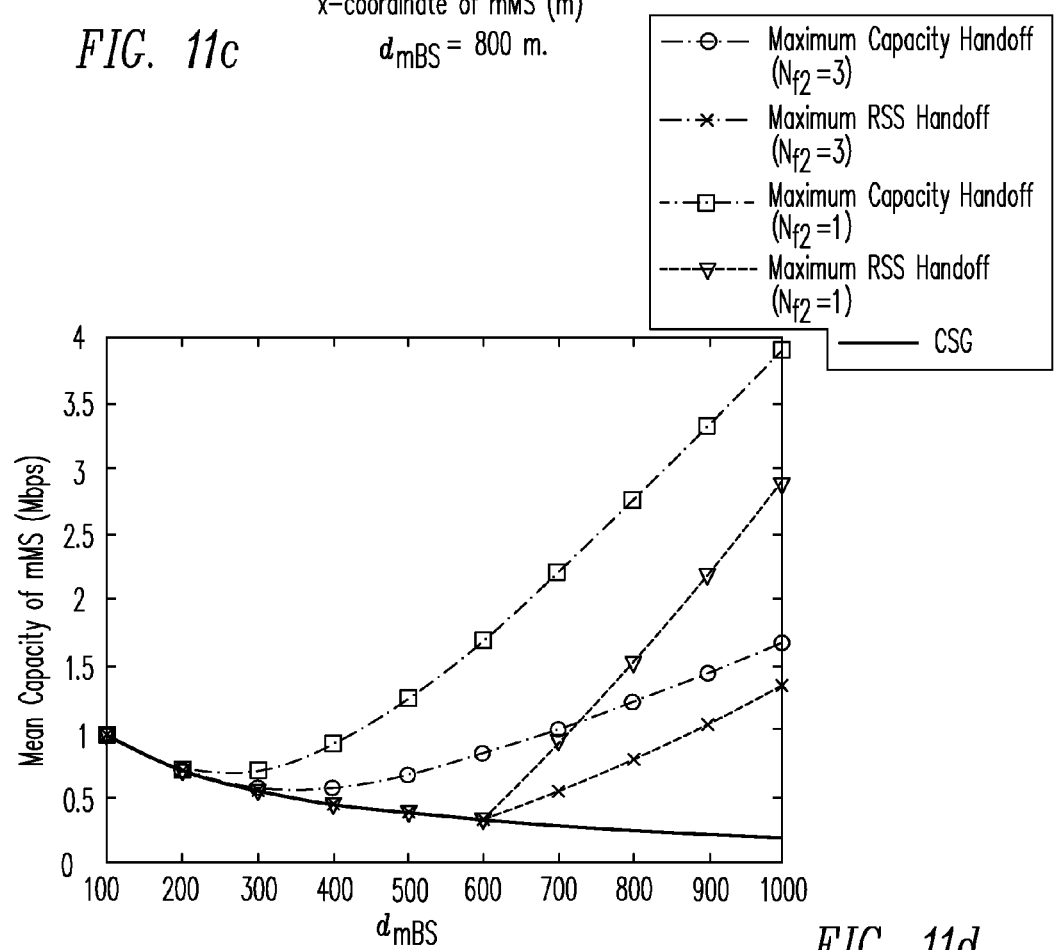
FIG. 11d
Mean capacity of mMs over the trajectory in Fig. 3.

$P_{fMS}$ = 10 dBM, $P_{mMS}$ = 20 dBM, $d_{mBS}$ = 500 m.

$P_{fMS}$ = 10 dBM, $P_{mMS}$ = 20 dBM, $d_{mBS}$ = 1000 m.

$P_{fBS} = 10$ dBm, $P_{mBS} = 40$ dBm, $d_{mBS} = 500$ m.

$P_{fBS} = 10$ dBm, $P_{mBS} = 40$ dBm, $d_{mBS} = 1000$ m.

METHODS FOR ENHANCING PERFORMANCE OF OPEN-ACCESS AND CLOSED-ACCESS FEMTOCELLS

CROSS-REFERENCE TO RELATED APPLICATIONS

The present application is related to and claims priority of U.S. Provisional patent application ("Copending Application"), Ser. No. 61/251,431, entitled "Methods for Enhancing Performance of Open-Access and Closed-Access Femtocells," filed on Oct. 14, 2009. The disclosure of the Copending Application is hereby incorporated by reference in its entirety.

BACKGROUND OF THE INVENTION

1. Field of the Invention

The present invention relates to wireless communications. More specifically, the present invention relates to improving performance of small co-located cellular networks (e.g., femtocells) under open-access and closed-access configurations.

2. Discussion of the Related Art

In a co-channel femtocell network, the femtocell reuses the spectrum resources of the co-located macrocell network. While a co-channel deployment brings efficient spectrum usage, co-channel deployment also results in co-channel interference (CCI) between the femtocell and the macrocell. The recent technical proposals, "3rd Generation Partnership Project; Technical Specification Group Radio Access Networks; 3G Home NodeB Study Item Technical Report (Release 8)," 3GPP, 3GPP TR 25.820, March 2008, and "Interference management in UMTS femtocells," FemtoForum, White Paper, December 2008, published online and made available at http://www.femtoforum.org/femto/Files/File/Interference Management in UMTS Femtocells.pdf, provide detailed discussions of different CCI scenarios among femtocell base stations (fBSs), macrocell base station (mBS), and the mobile stations (MSs). Choice of access control at a femtocell is believed to significantly impact the interference that is experienced under different macrocell and femtocell scenarios.

Co-channel femtocell networks may be "open-access" or "closed-access." In an open-access femtocell, any macrocell MS (mMS) is allowed to join the femtocell. An open-access femtocell often allows a large enough number of users to degrade the average bandwidth available per user. Alternatively, in a closed-access femtocell, e.g., a closed subscriber group (CSG) femtocell, only an authorized group of mMSs may join the femtocell. In a closed-access femtocell, significant interference may result between the femtocell and a close-by co-channel mMS that is not admitted to the femtocell. Simulation results comparing performance between open-access and closed-access femtocells have been reported in (a) "WiMAX femtocells: a perspective on network architecture, capacity, and coverage" ("Yeh"), S. P. Yeh, S. Talwar, S. C. Lee, and H. Kim, *IEEE Commun. Mag.*, vol. 46, no. 10, pp. 58-65, October 2008; (b) "Access methods to WiMAX femtocells: A downlink system-level case study," D. L. Perez, A. Valcarce, G. D. L. Roche, E. Liu, and J. Zhang; in *Proc. IEEE Int. Conf. Commun. Syst. (ICCS)*, Guangzhou, China, November 2008, pp. 1657-1662; and (c) "Performance of macro- and co-channel femtocells in a hierarchical cell structure," H. Claussen, in *Proc. IEEE Int. Symp. Personal, Indoor, Mobile Radio Commun. (PIMRC)*, Athens, Greece, September 2007, pp. 1-5. These reports show that open-access mode yields better overall system throughput and coverage. Yeh, in particular, also shows that CSG results in larger areal capacity gains in general. In Yeh's study, areal capacity gain is defined as the ratio of system capacity with one or more femtocells to the corresponding system capacity without a femtocell. Compared to the CSG mode, open-access operations have issues, such as privacy and burden on the backhaul of a femtocell.

In this following description, the term "femtocell" is used to represent a local cellular network that is co-located with a larger cellular network (e.g., a macrocell), the term "femtocell" or "macrocell" are merely illustrative, the principles disclosed herein are equally applicable to any pairing of a local cellular network that is co-located within the service area of a larger cellular network.

SUMMARY

Selection of an access mode for a co-located cellular network (e.g., a femtocell or a picocell network) is important from an interference point of view. While the open-access mode strains spectrum resources, a restricted access mode (e.g., CSG) may result in significant interference between femtocell and macrocell users.

According to one embodiment of the present invention, an open-access femtocell may improve its performance by load balancing, using a capacity-based metric to select a femtocell for each user seeking to associate with a femtocell. An exchange mechanism allows information (e.g., potential bandwidth) to be exchanged between a macrocell base station (mBS) and a femtocell base station (fBS), so as to allow a macrocell mobile station (mMS) to select a femtocell with the most available capacity. Alternatively, a fBS broadcasts its available bandwidth information to mMS's to allow the macrocell mobile stations to associate with the femtocell with the most capacity offered.

According to one embodiment of the present invention, a closed-access femtocell may improve performance through spectrum sensing, so as to optimally select a portion of the macrocell spectrum for reuse. Upon sensing the portions of the spectrum used by the femtocell MS's and the macrocell MS's, a femtocell BS may decide which portion of the spectrum to reuse, based on different criteria such as maximizing the combined capacity available to the femtocell mobile stations and the macrocell stations, assuring a minimum capacity for the adversely affected macrocell MS's, and assuring a maximum interference-over-thermal noise (IoT) value.

The present invention is better understood upon consideration of the detailed description below and the accompanying drawings.

BRIEF DESCRIPTION OF THE DRAWINGS

FIG. 2 shows, in a simple co-channel system (i.e., a femtocell provided within the service area of a macrocell), (a) downlink signals and interference, (b) uplink signals and interference and (c) a spectrum shared between the macrocell and the femtocell.

FIG. 3 shows communication among the fBS's, the mMS's and the mBS to exchange bandwidth information and to select a capacity-maximizing femtocell for each mMS, in accordance with one embodiment of the present invention.

FIG. 4 shows a second method for communicating among the fBS's, the mMS's and the mBS to exchange bandwidth information and to select a capacity-maximizing femtocell for each mMS, in accordance with one embodiment of the present invention.

FIGS. 11(a)-11(c) illustrate respectively the capacities available to the mMS at 300 m, 500 m, 800 m from the mBS (i.e., $d_{mBS}$), as a function of the x-coordinate of the mMS. (FIGS. 11(a)-11(c) are simulated based on the configuration of FIG. 9).

FIG. 11(d) shows the mean capacity available to the mMS over its trajectory of FIG. 9 (i.e., from x=−5 m to 25 m, y=8 m), as a function of $d_{mBS}$ and CSG, RSS or maximum capacity selection under different $N_{f2}$ values.

DETAILED DESCRIPTION OF THE PREFERRED EMBODIMENTS

Figure 1:
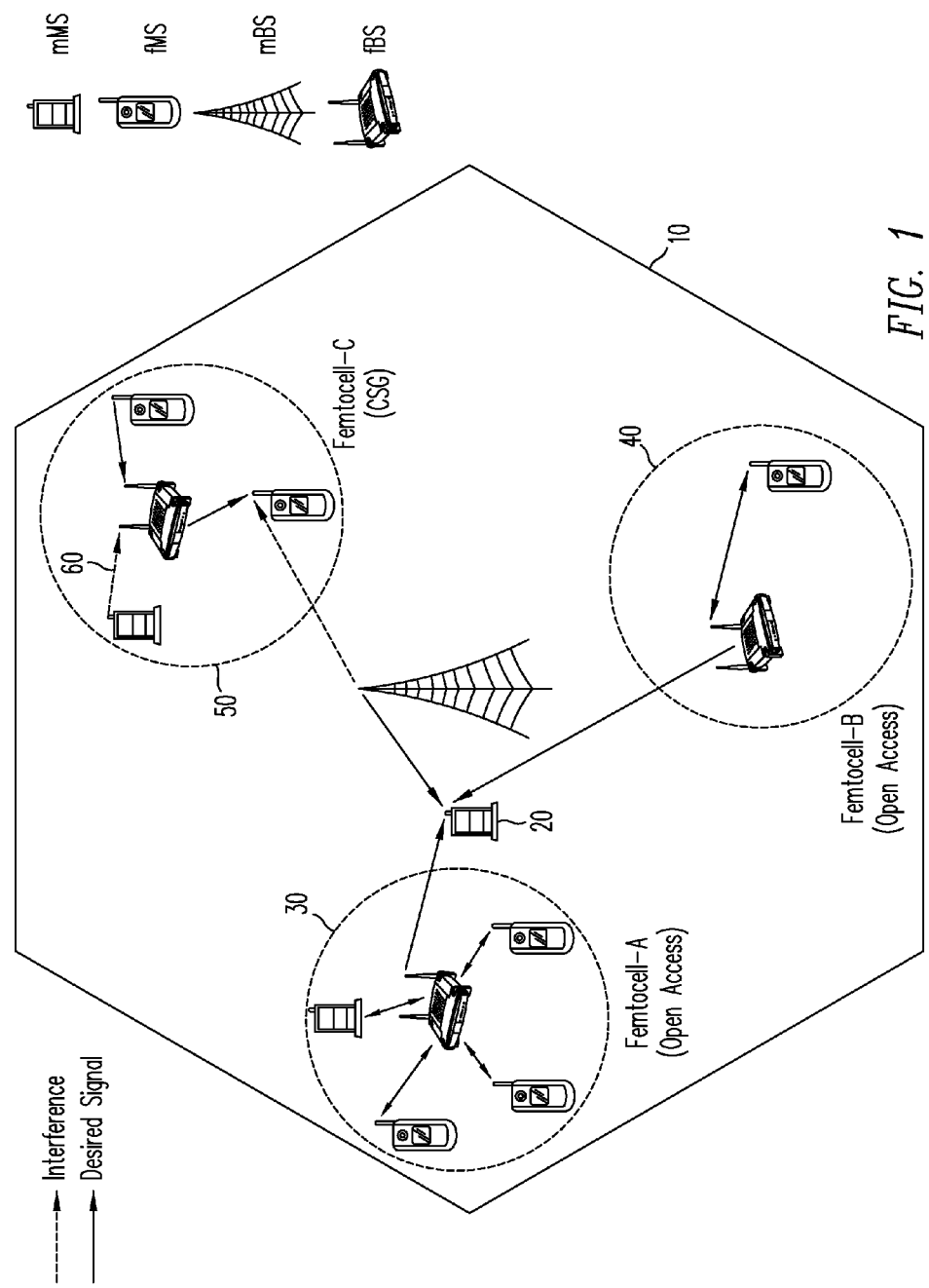
FIG. 1 shows macrocell user (mMS) 20 of macrocell 10; macrocell 10 has a service area that includes femtocells 30, 40 and 50.

FIG. 1 shows macrocell user (mMS) 20 of macrocell 10; macrocell 10 has a service area that includes open-access femtocells 30 and 40, and CSG type femtocell 50. The methods of the present invention improve the performances of both open-access mode and CSG type of femtocells. Typically, in an open-access mode femtocell, the received signal quality is used by mobile users to make hand-off and cell-selection decisions. However, as illustrated in FIG. 1, mMS 20 may receive better service if the hand-off decision is based on selecting the target femtocell with the lesser load (i.e., higher bandwidth per user), such as femtocell 40, even though a higher link quality is available at another femtocell, such as femtocell 30. FIG. 1 also shows that a CSG type femtocell (e.g., femtocell 50) suffers from large interference from mMS's (e.g., mMS 60), that are close to the femtocell.

The article, "Interference avoidance scheme in the 802.16m femto cell environments," S. Huan, K. Linling, and L. Jianhua, IEEE Standard Contribution C802.16m-09/0009, January 2009, describes interference scenarios that are illustrated by FIG. 2. FIG. 2 shows, in a simple co-channel system (i.e., a femtocell provided within the service area of a macrocell), (a) downlink signals and interference, (b) uplink signals and interference and (c) a spectrum shared between the macrocell and the femtocell. In FIG. 2, a single femtocell mobile station (fMS), which uses the spectrum resources of the femtocell, is situated near an mMS. The downlink (DL) and uplink (UL) transmissions of the femtocell and the macrocell are aligned in time (i.e., the DL transmissions of both the femtocell and the macrocell occurs simultaneously) During the UL, the transmission of mMS 150 interferes with the reception at fBS 160 and the transmission of fMS 140 interferes with the reception at mBS 170. Similarly, during the DL, the transmission of mBS 130 interferes with reception at fMS 100 and the transmission of fBS 120 interferes with the reception at mMS 110.

The present invention provides a framework for capacity-maximizing cell selection for an mMS. In addition, the present invention provides criteria for optimal reuse of the macrocell spectrum resources (e.g., overlap band 180 of the spectrum in FIG. 2(c)) at a femtocell. In one embodiment of the present invention, the femtocell reuses the macrocell spectrum only when the reuse maximizes the combined capacity available to the users of the femtocell and the macrocell. In one other embodiment of the present invention, the femtocell reuses the macrocell spectrum only when a minimum rate is guaranteed for any adversely affected mMS in the vicinity of a femtocell. The rate information of the mMS may be communicated to the femtocell by the macrocell BS over the backhaul. Yet in one other embodiment of the present invention, the femtocell reuses the macrocell spectrum only when the interference-over-thermal noise (IoT) threshold observed over the femtocell's spectrum is below a threshold.

According to one embodiment of the present invention, capacity models for both the UL and DL in the two-user scenarios of FIG. 2, respectively, are set forth below. In these capacity models, as shown in FIG. 2(c), the mMS uses only a portion of its allocated spectrum 190, while the fMS uses the full spectrum 180 allocated to it. Furthermore, the system may use multicarrier transmissions, with each resource unit capable of being individually demodulated. In the following, the capacity models are first derived with the mMS assumed sufficiently far away from the femtocell such that a hand-off of the mMS to the femtocell is not possible. Under that assumption, the capacity models need not distinguish between open-access and CSG mode operations for the femtocell. The "no hand-off" constraint is then relaxed to provide capacity models for both open-access and CSG mode femtocells, assuming a lesser mMS-fBS distance. Techniques for improving the capacities under the respective operation modes are also provided.

With respect to the UL shown in FIG. 2(a), when the mMS is far away from the femtocell, the capacities (i.e., bandwidths) available to the mMS and fMS can be respectively written as $$C_{UL}^{(mMS)} = N_m B \log\left(1 + \frac{N_m P_{mMS,mBS}}{N_m P_{fMS,mBS} + N_m B N_0}\right), \quad (1)$$

$$C_{UL}^{(fMS)} = (N_f - N_m) B \log\left(1 + \frac{(N_f - N_m) P_{fMS,fBS}}{(N_f - N_m) B N_0}\right) + N_m B \log\left(1 + \frac{N_m P_{fMS,fBS}}{N_m P_{mMS,fBS} + N_m B N_0}\right), \quad (2)$$

where $N_m$ is the number of resource units used by the mMS, B is the bandwidth per resource unit, $P_{tx,rx}$ is the received power per resource unit at receiver rx from the transmitter tx, $N_0$ is the noise power, and $N_f$ is the number of resource units available for the femtocell. Then, the combined UL capacity for the two users is given by $$C_{UL} = C_{UL}^{(mMS)} + C_{UL}^{(fMS)}. \quad (3)$$

If the mMS user becomes closer to the femtocell, its transmission results in stronger UL interference with the fBS under the CSG mode. Such interference is avoided in the open-access mode by allowing a hand-off of the mMS to the femtocell, at the expense of a reduced average user bandwidth at the femtocell.

Similar to the UL capacities above, DL capacity for the mMS under the interference from the fBS can be written as $$C_{DL}^{(mMS)} = N_m B \log\left(1 + \frac{N_m P_{mBS,mMS}}{N_m P_{fBS,mMS} + N_m B N_0}\right), \quad (4)$$

while the DL capacity for the fMS is given by $$C_{DL}^{(fMS)} = (N_f - N_m) B \log\left(1 + \frac{(N_f - N_m) P_{fBS,fMS}}{(N_f - N_m) B N_0}\right) + \quad (5)$$

$$N_m B \log\left(1 + \frac{N_m P_{fBS,fMS}}{N_m P_{mBS,fMS} + N_m B N_0}\right).$$

Hence, the combined DL capacity for the two users is given by $$C_{DL} = C_{DL}^{(mMS)} + C_{DL}^{(fMS)}. \quad (5)$$

If the mMS user becomes closer to the femtocell, a hand-off to the femtocell is possible under the open-access mode due to the better signal quality, while stronger DL interference results from the fBS under the CSG mode (i.e., the mMS cannot handoff to the fBS).

Under the open-access mode, the mMS can make a hand-off to the femtocell. The criterion for triggering a hand-off is an optimization that affects significantly the combined throughputs of the femtocell users and the macrocell users. Typically, the cell with the strongest received signal strength (RSS) is selected for handoff (see e.g., the article, "Proposed text for HO from femtocell BS to macro BS or other femtocell BS (AWD-femto)," K. Y. Lin, H. P. Lin, and R. T. Juang, IEEE Standard Contribution C802.16m-09/1307, July 2009). That is, the cell with the best signal quality is selected by:

$$\hat{i} = \underset{i}{\mathrm{argmax}}\{P_{i,mMS}\}, \quad (7)$$

where i denotes the candidate cell index, and the mMS makes a hand-off to the cell with the best signal quality. Other parameters affecting capacity available to an mMS, such as interference and bandwidth, may also be taken into account. For example, as described above with respect to FIG. 1, the link quality between mMS 20 and femtocell 30 or the mBS of macrocell 10 may be better than the link quality between mMS 20 and femtocell 40. However, FIG. 1 shows that femtocell 30 is already associated with several users, and thus is likely to offer a less desirable bandwidth per user, while the bandwidth for user is likely better at femtocell 40, which is associated with only a single user. Therefore, due to the availability of greater spectrum resources, femtocell 40 may offer better capacity to mMS 20, as compared to Femtocell 30 or macrocell 10. The capacity-maximizing cell selection criterion for the mMS is simply:

$$\hat{i} = \underset{i}{\mathrm{argmax}}\{C_{DL,i}^{(mMS)}\}, \quad (8)$$

where $C_{DL,i}^{(mMS)}$ denotes the resulting DL capacity of the mMS if it makes a hand-off to cell-i. Averaging the received signals and multiple threshold tests may be used to avoid the so-called ping-pong effect (i.e., the MS switching links frequently between different cells). Equation (8) takes into account link quality, the available bandwidth and interference. The advantages of equation (8) thus include 1) fairer distribution of the spectrum among macrocell and femtocell users, 2) a lower limit for the number of users that may be connected to a femtocell, and 3) a lesser burden on the backhaul of the femtocell network.

Referring back to the DL example in FIG. 2(a), assuming that each femtocell user is given equal bandwidth after a hand-off to the femtocell, the capacities of fMS 110 and mMS 120 under an open-access femtocell can be respectively written as $$C_{OA,mMS} = \frac{N_f B}{2} \log\left(1 + \frac{2 P_{fBS,mMS}}{B N_0}\right). \quad (9)$$

$$C_{OA,fMS} = \frac{N_f B}{2} \log\left(1 + \frac{2 P_{fBS,fMS}}{B N_0}\right), \quad (10)$$

Comparing equations (9) and (10) with corresponding equations (1) and (2), the capacity available to fMS 110 degrades due to a reduced usable bandwidth, while the capacity available to mMS 120 (after association with the femtocell) improves. Since the overall capacity of the cells and the number of fMSs per femtocell are balanced through this approach, this approach is also referred to as "open access with load balancing (OA-LB)."

To calculate a capacity after a hand-off to each femtocell and to select from the calculated capacities the best capacity femtocell using equation (8), information exchange is required between the femtocells and the macrocell. For example, the number of users served by each femtocell and the available bandwidth at each femtocell must be shared among the femtocells and the macrocell to allow calculating the post-hand off capacities. Such information may be exchanged in multiple ways. One way is outlined by FIG. 3. FIG. 3 shows communication among the femtocells, the mMS's and the mBS to exchange bandwidth information and to select a capacity-maximizing femtocell for each mMS, in accordance with one embodiment of the present invention. As shown in FIG. 3, at step 200, femtocells communicate their respective available bandwidths (or, their respective numbers of users associated) to the mBS. At the same time, at step 210, each mMS measures the SINR with each femtocell and communicate the measurements to the mBS. Once the mBS has the capacity data and the signal strength data, at step 220, the mBS can calculate the capacity available to the mMS after a hand-off to a femtocell. From the calculated capacities, at step 230, the mBS may select for each mMS the femtocell that results in the greatest capacity available to the mMS, and triggers a hand-off of the mMS to the selected femtocell. To avoid frequent hand-offs between cells with similar capacities (i.e., the "ping-pong" effect), a hand-off is triggered only if the hand-off to the femtocell results in a capacity improvement that exceeds a threshold $\delta_{cap}$ between the current capacity and post-hand off capacity. The capacity can also be required to be averaged over a duration $\delta_{time}$, to smooth out the effect of noise.

FIG. 4 shows a second method for communicating among the fBS's, the mMS's and the mBS to exchange bandwidth information and to select a capacity-maximizing femtocell for each mMS, in accordance with one embodiment of the present invention. In this second method, at step 240, the femtocells broadcast their respective available bandwidths to the mMS's. At the same time, at step 250, each mMS measures the SINR it experiences with each femtocell. Once the mMS learns about the available bandwidth available to each femtocell, the mMS calculates the potential capacity that it may expect available in each femtocell, and selects the candidate femtocell offering the greatest post-hand-off capacity, using equation (8), for example. Again, to avoid frequent hand-offs between cells with similar capacities, a hand-off is triggered only if the hand-off to the femtocell results in a capacity improvement that exceeds a threshold $\delta_{cap}$ between the current capacity and post-hand off capacity (step 260). The capacity can also be required to be averaged over a duration $\delta_{time}$, to smooth out the effect of noise.

Figure 5:
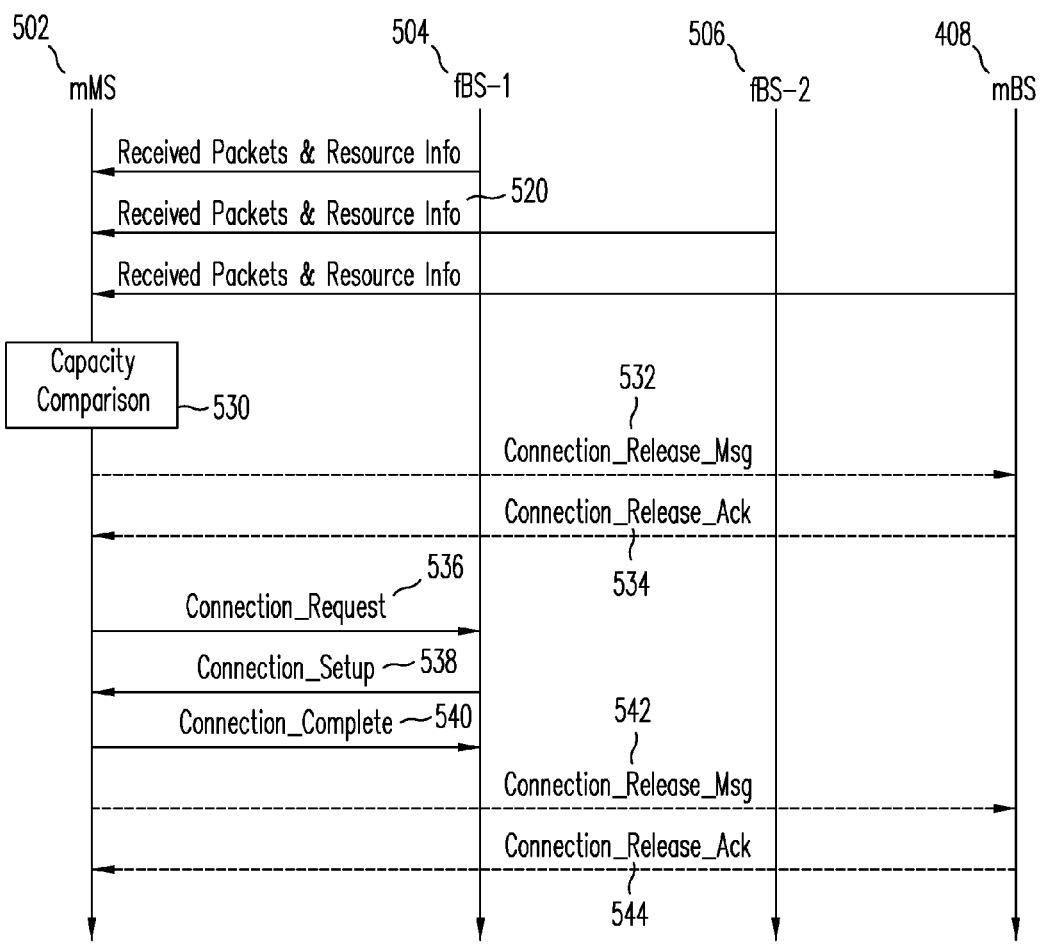
FIG. 5 shows an example of information exchange through broadcasting of resource information between an mMS 502, fBS's 504 and 506 and mBS 508, in accordance with one embodiment of the present invention.

FIG. 5 shows an example of information exchange through broadcasting of resource information between mMS 502, fBS's 504 and 506 and mBS 508, in accordance with one embodiment of the present invention. Over a predetermined time period, at step 520, fBS's 504 and 506 and mBS 508 broadcast messages relating to their respective available resource information. The frequency at which the resource information is communicated may be determined based on spectrum efficiency considerations, for example. A lesser frequency of information exchange, however, may result in less efficient hand-offs, if the resource within the cells change more frequently than the frequency of communication. Therefore, the resource information broadcast messages may be provided as frequently as seconds, minutes, hours, or even days, depending on how often the traffic within these cells significantly vary. Once the mMS receives the resource information (e.g., available bandwidth), at step 530, using the SINR measurements it makes of each cell, the mMS may calculate the capacity available to it at each femtocell, and selects the cell that offers the best capacity using, for example, equation (8). In the example in FIG. 5, mMS 502 selects fBS 504 to hand-off, as fBS 504 provides the greater capacity. Handing off to fBS 504 involves: (a) mMS 502 sending a Connection_Request message 536 to fBS 504; (b) in response, fBS 504 sends Connection_Setup message 538 back to mMS 502; and (c) mMS 502 acknowledges Connection_Setup message 538 by Connection_Complete message 540. Under the 3GPP standard, the corresponding messages are RRCConnectionRequest, RRCConnectionSetup, and RRCConnectionComplete. mMS 502 may also release the connection with the previously serving cell (i.e., mBS 508) before establishing connection with fBS 504 (i.e., messages 532 and 534), or after establishing connection with fBS 504 (i.e., messages 542 and 544).

Figure 6:
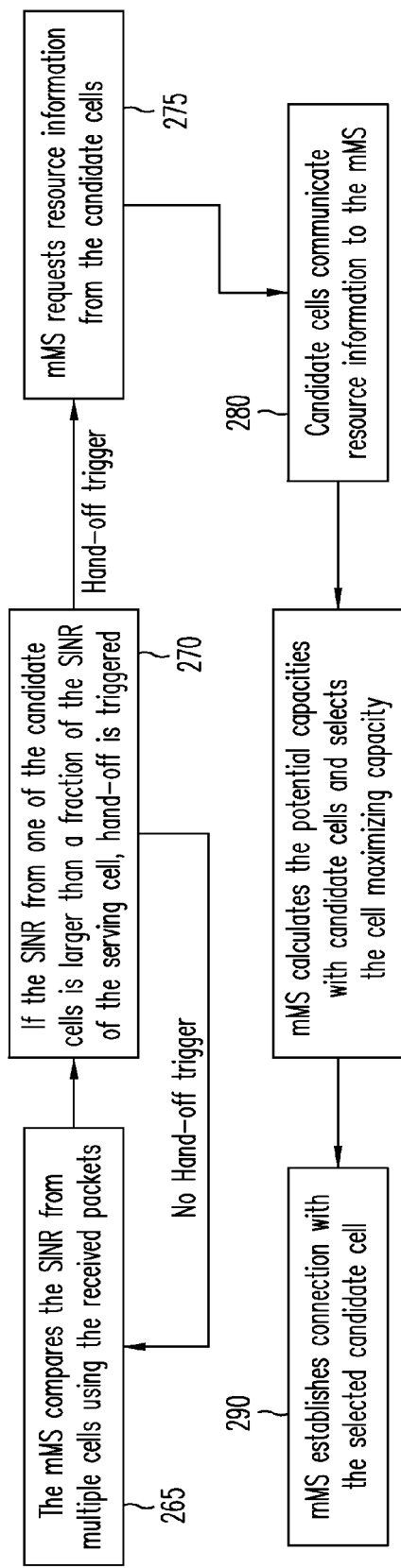
FIG. 6 shows a third method for communicating among the fBS's, the mMS's and the mBS to exchange bandwidth information and to select a capacity-maximizing femtocell for each mMS, in accordance with one embodiment of the present invention.

FIG. 6 shows a third method for communicating among the fBS's, the mMS's and the mBS to exchange bandwidth information and to select a capacity-maximizing femtocell for each mMS, in accordance with one embodiment of the present invention. Unlike the method of FIG. 4, in this third method, the resource information at different femtocells is requested by each mMS from each femtocell when needed. As shown in FIG. 3, at step 265, a mMS continuously monitors the SINR of the received packets from all the femtocells. At step 270, if the SINR of any of the candidate cells is greater than $\kappa*SINR_{serving}$, a hand-off process is triggered, where $SINR_{serving}$ is the SINR of the current serving cell, and $\kappa$ is a scaling factor that depends on the implementation and the typical spectrum resources available in the serving cell and candidate cells. For example, typically, less spectrum resources are available for the mMS from the macrocell than the spectrum resources available in the femtocells. Therefore, if the serving cell is the macrocell, one may select $\kappa<1$ (e.g., 0.6), to favor the mMS handing-off to one of the candidate cells. When a hand-off is triggered, at step 275, the mMS requests resource information (e.g., available spectrum, number of users, traffic information etc.) from the candidate cells. At step 280, each of the candidate cells communicate the requested information. To decide whether a hand-off is desired, the mMS compares the capacity available from each candidate cells with the capacity provided in the current serving cell. At step 285, if the capacity of any of the candidate cells exceeds the capacity of the serving cell, the mMS selects and establishes connection with that candidate cell at step 290. However, if the capacity of the serving cell exceeds the capacities of all the candidate cells, the mMS may keep its connection with the serving cell, rather than handing-off to a candidate cell. Again, as discussed before, to avoid frequent hand-offs between cells with similar capacities (i.e., the "ping-pong" effect), a hand-off is triggered only if the hand-off to the femtocell results in a capacity improvement that exceeds a threshold $\delta_{cap}$ between the current capacity and post-hand off capacity. The capacity can also be required to be averaged over a duration $\delta_{time}$, to smooth out the effect of noise.

Figure 7:
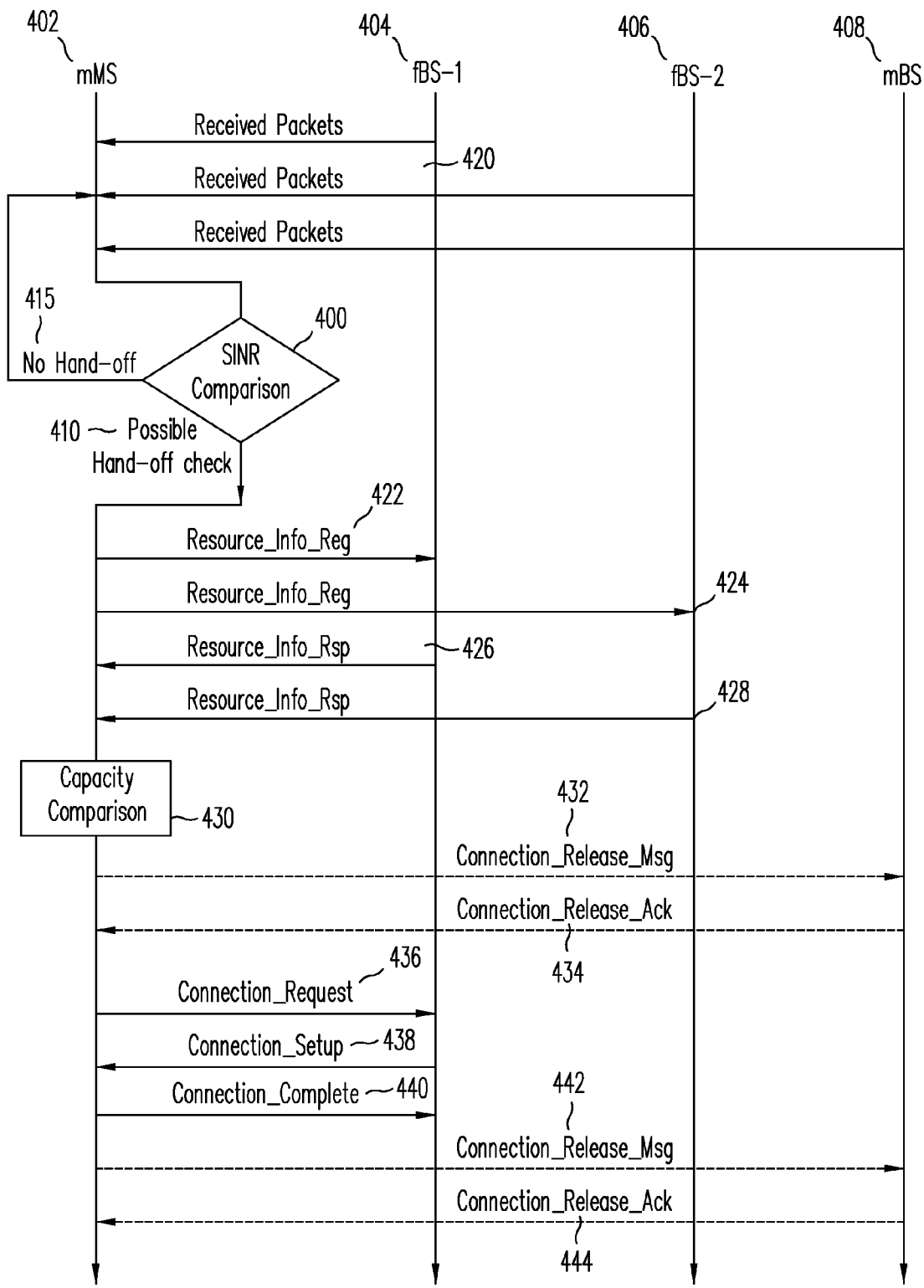
FIG. 7 shows an example of information exchange through polling of resource information between an mMS 402, fBS's 404 and 406 and mBS 408, in accordance with one embodiment of the present invention.

FIG. 7 shows an example of information exchange through polling of resource information between an mMS 402, fBS's 404 and 406 and mBS 408, in accordance with one embodiment of the present invention. As shown in FIG. 7, at step 420 mMS 402 periodically monitors the SINR of the received packets from different femtocells. At step 400, when the SINR of any of the candidate cells exceeds $\kappa*SINR_{serving}$, mMS 402 triggers a hand-off check at step 410. Otherwise, at step 415, mMS 402 returns to monitoring the SINR of all the cells. When a hand-off check is triggered, mMS 402 evaluates at step 430 the post-hand-off capacity available at each femtocell. Accordingly, prior to step 430, mMS 402 sends Resource_Info_Req messages 422 and 424 to candidate cells 404 and 406 to request the femtocells for their respective available resources (e.g., its spectrum and the number of users, traffic information). In response, candidate femtocells 404 and 406 respond with Resource_Info_Rsp messages 426 and 428 with the requested information. Once all the resource information is collected at mMS 402, the post-hand-off capacity is calculated for each of the candidate cells 404 and 406. If any of the candidate capacities is sufficiently greater than the capacity currently provided by the serving cell, mMS 402 establishes a connection with that candidate cell (in this case, femtocell 402) by exchanging hand-off protocol messages 436, 438 and 440. The connection with the serving cell may be released before establishing connection with femtocell 402 (i.e., exchanging release protocol messages 432 and 434) or after establishing connection with femtocell 402 (i.e., exchanging release protocol messages 442 and 444).

Under the CSG mode, a femtocell uses the same spectrum as an mMS. However, when the mMS is close to the femtocell, the DL capacity available to mMS according to equation (4) and the UL capacity provided to the fMS according to equation (2) may be too low due to the presence of interference in the system, as reported in the article "A comparative study of different deployment modes for femtocell networks," H. Mahmoud and I. Guvenc, in *Proc. First IEEE Int. Workshop on Indoor and Outdoor Femto Cells (IOFC), in conjunction with IEEE PIMRC* 2009, Tokyo, Japan, September 2009. Therefore, a combined capacity maximizing criteria for deciding when a frequency resource of the macrocell should be used at a femtocell is provided, according to one embodiment of the present invention. Other criteria such as an IoT threshold, and a minimum mMS capacity can also be used, as discussed earlier.

First, in the case that the femtocell avoids using the same spectrum resources of the mMS, the UL capacities for the mMS and fMS may be respectively written as $$\tilde{C}_{CSG,UL}^{(mMS)} = N_m B \log\left(1 + \frac{N_m P_{mMS,mBS}}{N_m B N_0}\right), \quad (11)$$

$$\tilde{C}_{CSG,UL}^{(fMS)} = (N_f - N_m) B \log\left(1 + \frac{(N_f - N_m) P_{fMS,fBS}}{(N_f - N_m) B N_0}\right), \quad (12)$$

Accordingly, the combined UL capacity may be expressed as $$\tilde{C}_{UL} = \tilde{C}_{CSG,UL}^{(mMS)} + \tilde{C}_{CSG,UL}^{(fMS)}. \quad (13)$$

Comparing equation (13) with equation (3), the femtocell in equation (13) no longer benefits from the overlapping bandwidth (OB). However, for a smaller mMS-fBS distance $d_{mMS,fBS}$, interference in the OB may be significant for both the femtocell and the macrocell. Therefore, avoiding reuse of the OB improves the combined capacity expressed in equation (13) for a smaller $d_{mMS,fBS}$.

Assuming that the femtocell is capable of perfect spectrum sensing (SS), and can decide optimally when to reuse the OB, the threshold criteria for reusing the OB may be obtained from equating equations (3) and (13), which may be rewritten as:

$$\left(1 + \frac{P_{mMS,mBS}}{P_{fMS,mBS} + BN_0}\right)\left(1 + \frac{P_{mMS,mBS}}{P_{mMS,fBS} + BN_0}\right) = \left(1 + \frac{P_{mMS,mBS}}{BN_0}\right), \quad (14)$$

Or, $$(BN_0)^2(P_{fMS,fBS} + P_{mMS,mBS}) + BN_0 P_{fMS,fBS} P_{fMS,mBS} + \quad (15)$$
$$BN_0 P_{mMS,mBS} P_{mMS,fBS} + BN_0 P_{mMS,mBS} P_{fMS,fBS} =$$
$$P_{mMS,mBS} P_{mMS,fBS} P_{fMS,mBS} + BN_0 P_{mMS,mBS} P_{mMS,fBS} +$$
$$BN_0 P_{mMS,mBS} P_{fMS,mBS} + (BN_0)^2 P_{fMS,fBS}.$$

Cancelling common terms, equation (15) becomes:

$$BN_0(P_{fMS,fBS}P_{fMS,mBS} + P_{mMS,mBS}P_{fMS,fBS}) + \\
(BN_0)^2 P_{fMS,fBS} = P_{mMS,mBS}P_{mMS,fBS}P_{fMS,mBS} + \\
BN_0 P_{mMS,mBS}P_{fMS,mBS}, \quad (16)$$

Dividing both sides of equation (16) by $P_{mMS,mBS}$ provides:

$$\frac{BN_0 P_{fMS,fBS} P_{fMS,mBS}}{P_{mMS,mBS}} + \frac{(BN_0)^2 P_{fMS,fBS}}{P_{mMS,mBS}} + BN_0 P_{fMS,fBS} = \quad (17)$$
$$P_{mMS,fBS} P_{fMS,mBS} + BN_0 P_{fMS,mBS}.$$

In equation (17), because the terms having the $N_0^2$ and $N_0 P_{fMS,mBS}$ factors are typically much less than the other terms, the terms having $N_0^2$ and $N_0 P_{fMS,mBS}$ factors can be neglected, so that equation (17) can be approximated by:

$$P_{mMS,fBS} = \frac{BN_0 P_{fMS,fBS}}{P_{fMS,mBS}}. \quad (18)$$

Equation (18) provides the UL interference power threshold between the mMS and the fBS. When the UL interference is greater than this threshold, the OB at the femtocell is preferably not reused, so as to reduce the impact of the interference on the capacities available to the mMS's and the fMS. Moreover, by using the related outdoor-to-indoor path loss models, the corresponding threshold distance $\delta_{fBS\text{-}mMS}$ may be explicitly obtained from equation (18), by substituting the path loss equations into the power term $P_{mMS,fBS}$.

As discussed above, perfect spectrum sensing (SS) may be achievable at the femtocell, and the UL combined capacity under CSG-SS (i.e., closed subscriber group—spectrum sensing) can be simply written as $$C_{CSG,UL}^{(SS)} = \begin{cases} C_{UL} & \text{if } P_{mMS,fBS} < \frac{BN_0 P_{fMS,fBS}}{P_{fMS,mBS}} \\ \tilde{C}_{UL} & \text{if } P_{mMS,fBS} \geq \frac{BN_0 P_{fMS,fBS}}{P_{fMS,mBS}}, \end{cases} \quad (19)$$

where, $C_{UL}$ is provided by equation (3) and $\tilde{C}_{UL}$ is provided in equation (13).

If the femtocell avoids using the spectrum resources of the mMS, the DL capacities for the mMS and fMS are respectively provided by:

$$\tilde{C}_{CSG,DL}^{(mMS)} = N_m B \log\left(1 + \frac{N_m P_{mBS,mMS}}{N_m B N_0}\right), \quad (20)$$

$$\tilde{C}_{CSG,DL}^{(fMS)} = (N_f - N_m) B \log\left(1 + \frac{(N_f - N_m) P_{fBS,fMS}}{(N_f - N_m) B N_0}\right), \quad (21)$$

where, the downlink combined capacity with no reuse of the OB becomes $$\tilde{C}_{DL} = \tilde{C}_{CSG,DL}^{(mMS)} + \tilde{C}_{CSG,DL}^{(fMS)}. \quad (22)$$

As in the UL, the DL combined capacity with CSG-SS can be obtained after equating equation (6) and equation (22) and assuming the terms $N_0^2$ and $P_{fBS,mMS}N_0$ are negligible relative the other terms. Therefore:

$$C_{CSG,DL}^{(SS)} = \begin{cases} C_{DL} & \text{if } P_{fBS,mMS} < \frac{BN_0 P_{fBS,fMS}}{P_{mBS,fMS}} \\ \tilde{C}_{DL} & \text{if } P_{fBS,mMS} \geq \frac{BN_0 P_{fBS,fMS}}{P_{mBS,fMS}}, \end{cases} \quad (23)$$

where, $C_{UL}$ is provided by equation (6) and $\tilde{C}_{UL}$ is provided in equation (22). As in the UL case, the corresponding distance threshold $\delta_{fBS\text{-}mMS}$ can be explicitly obtained by substituting the related path-loss models into $P_{fBS,mMS}$.

Figure 8:
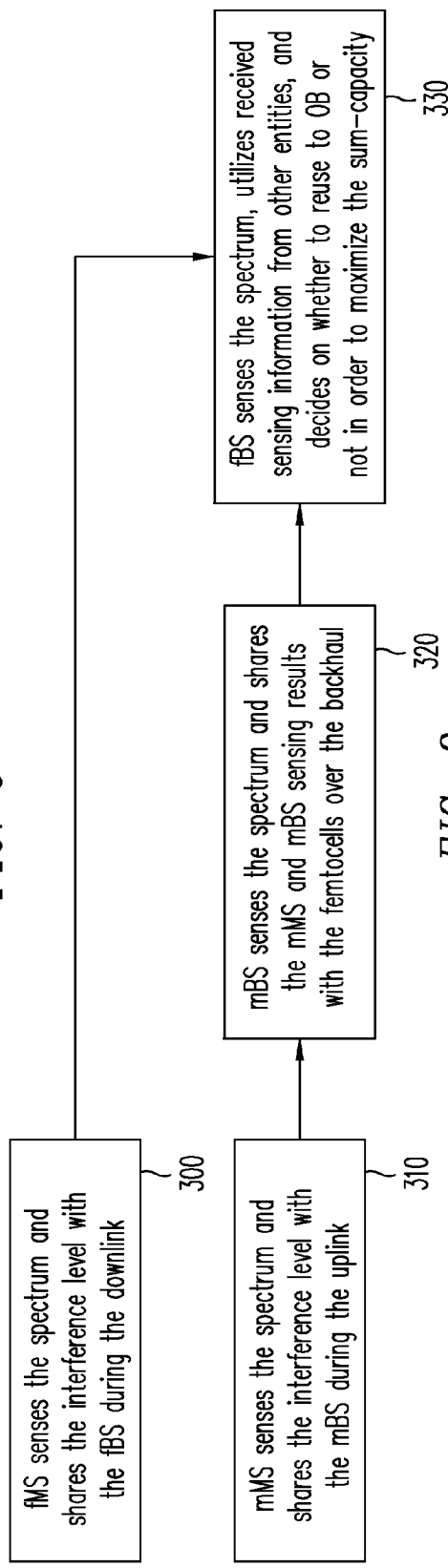
FIG. 8 shows one method for an fBS in a CSG type femtocell to determine whether or not to reuse an overlapped band (OB) in order to maximize the combined capacity, according to one embodiment of the present invention.

To implement CSG-SS, as in the case of open access with load balancing (i.e., OA-LB), some information exchange is required between the macrocell and the femtocells. During the DL, spectrum sensing of the mMS are required, since the impact of interference varies depending on the distance between the fBS and the mMS. During the UL, sensing results at the fBS are required, as the impact of interference is dependent on the $d_{mMS,fBS}$ distance. FIG. 8 shows one method for an fBS to determine whether or not to reuse an overlapped band (OB) in order to maximize the combined capacity in a CSG type femtocell, according to one embodiment of the present invention. As shown in FIG. 8, the fMS (at step 300), the mMS (at step 310), and the mBS (at step 320) each sense its spectrum and share their respective detected levels of interference. The fMS and the mMS, at steps 300 and 310, share their respective detected interference levels with the fBS and the mBS during their uplinks. At step 320, the mBS shares the detected interference levels detected by itself and the mMS's with the femtocells, using backhaul connections. At step 330, each fBS combines its local sensing results with the sensing results of the fMS's, the mMS's and the mBS, to decide whether to reuse the OB (i.e., the overlapped band) during the uplink and the downlink. The determination of whether or not to reuse the OB for the UL and DL may be based, for example, on equations (18) and (23) respectively.

Various computer simulations have been performed to evaluate the potential gains of the techniques discussed above. Most of the key simulation parameters are selected based on "Interference management in UMTS femtocells" paper discussed above, and are summarized in Table I, where the indoor/outdoor path loss models as specified in ITU P.1238 and ITU P.1411 are implemented:

TABLE 1

Parameters for representative simulations.

| Parameter | Value |
| --- | --- |
| Central frequency | 2.1 GHz |
| Bandwidth | 10 MHz, 5 MHz |
| DL transmit power (mBS, fBS) | 40 dBm, 10 dBm |
| UL transmit power (mMS, fMS) | 20 dBm, 10 dBm |
| Thermal noise density | −174 dBm/Hz |
| Wall penetration loss (WL) | 5 dB, 10 dB |
| Antenna heights (mBS, fBS, MS) | 15 m, 1.5 m, 1.5 m |
| House size | 15 m × 15 m |
| Scheduling strategy | Equal bandwidth per user |

Figure 9:
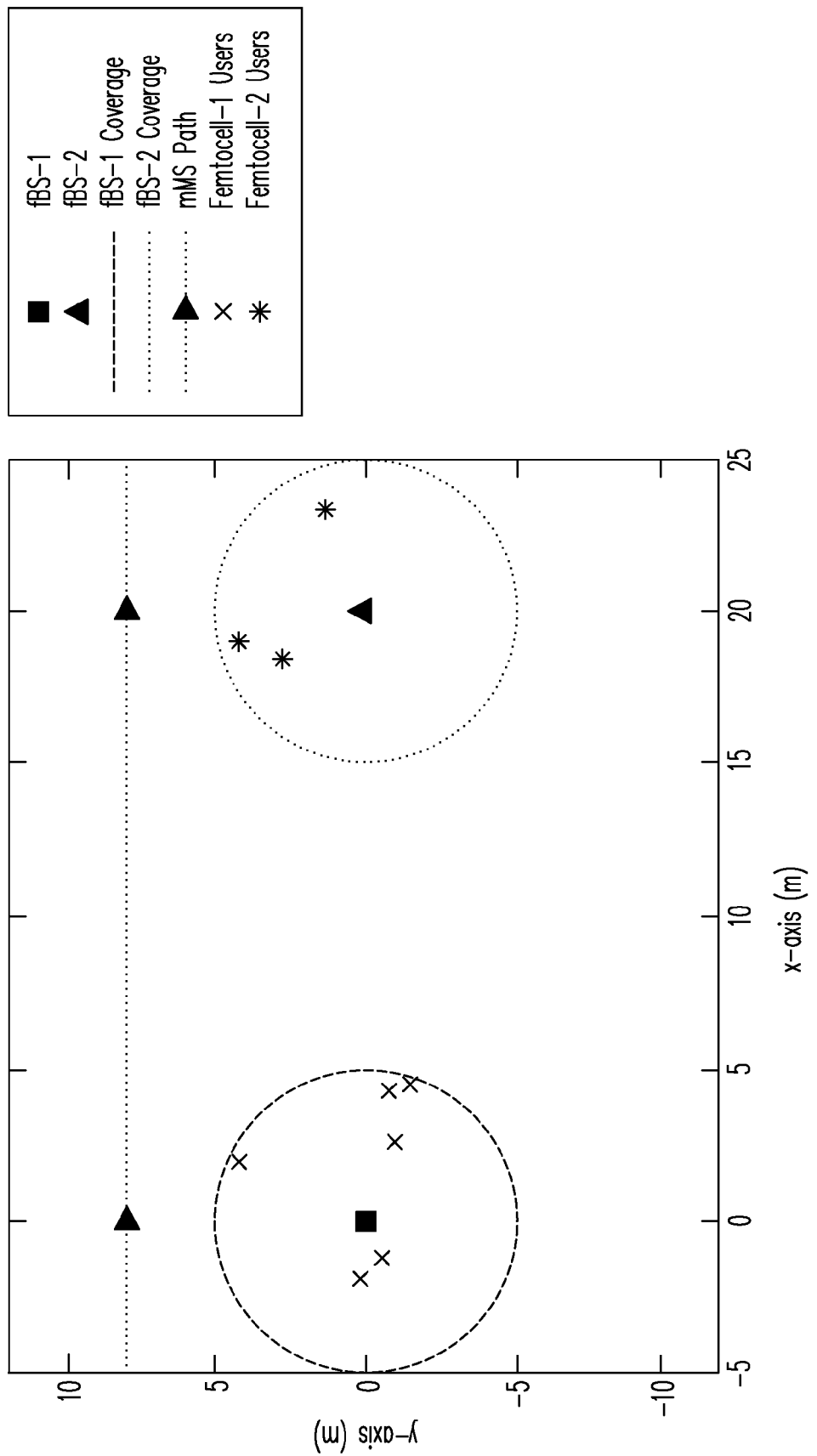
FIG. 9 shows a system that is used as a model for the open-access mode simulations of FIGS. 10(a)-(b) and FIGS. 11(a)-11(d).

FIG. 9 shows a system that is used as a model for the open access mode simulations of FIGS. 10(a)-(b) and FIGS. 11(a)-11(d). As shown in FIG. 9, two fBSs (i.e., fBS-1 and fBS-2) are located at positions (0, 0) m and (20, 0) m, serving $N_{f1}=6$ and $N_{f2}=3$ femtocell users, respectively. Both fBSs have a wall-penetration loss of 5 dB. An mBS (not shown on the figure) is located at $(d_{mBS}^{1/2}, d_{mBS}^{1/2})$, where $d_{mBS}$ denotes the distance between fBS-1 and the mBS. A total of 10 MHz of spectrum is available, which is used simultaneously by the femtocells and the macrocell. The macrocell may serve, for example, 100 users. The mMS locations on a line that is parallel to the x-axis are simulated (e.g., from the coordinate (−40, 8) m to (60, 8) m).

Figure 10A:
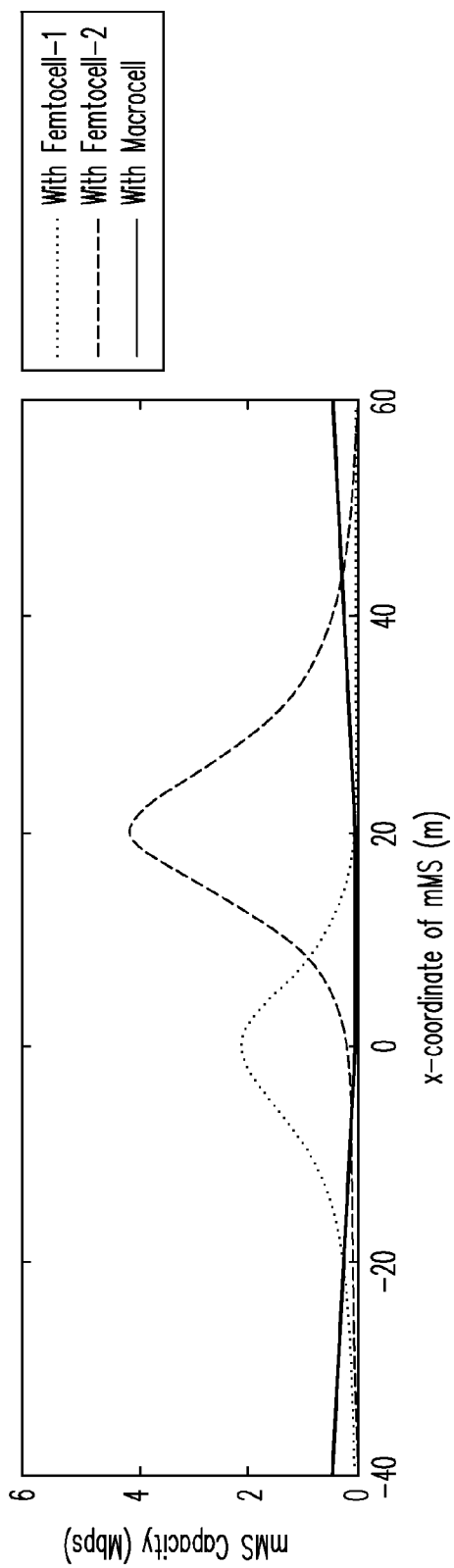
FIGS. 10(a) and 10(b) plot respectively the capacities and the received signal strengths of an mMS associated with the femtocell-1, the femtocell-2, and the macrocell of FIG. 9, where the mMS is located at $d_{mBS}$=800 m.
Figure 10B:
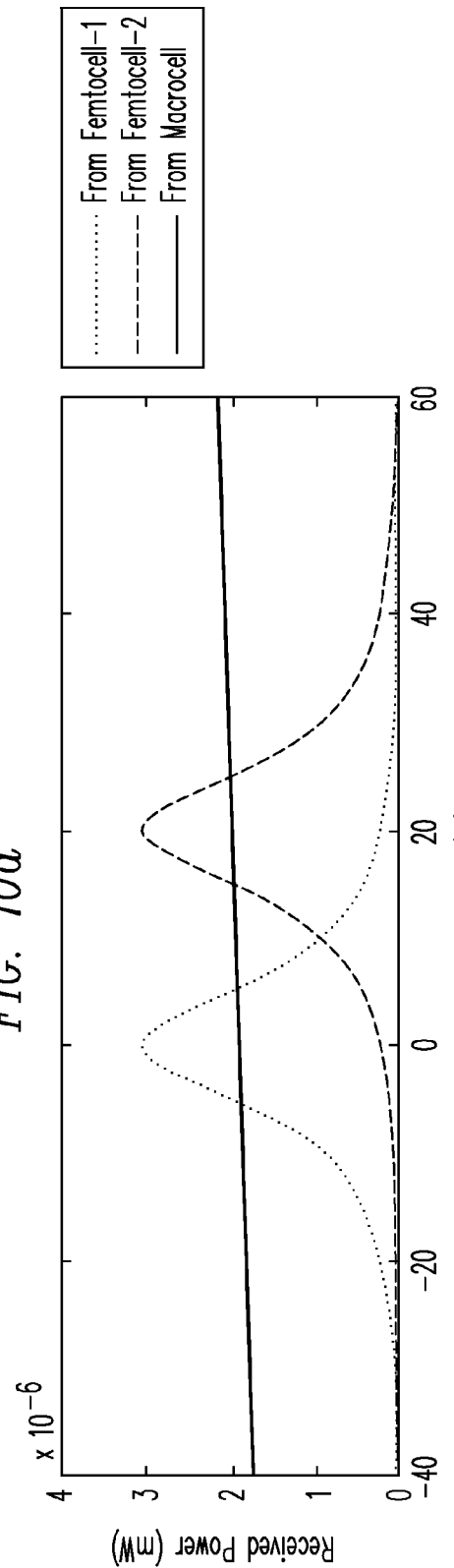

FIGS. 10(a) and 10(b) plot respectively the capacities and the received signal strengths of an mMS associated with a femtocell-1, femtocell-2, and the macrocell of FIG. 9, where the mMS is located at $d_{mBS}=800$ m. As shown in FIG. 10(b), even though the received signal power from the macrocell is comparable to the received signal power from either of the femtocells, the macrocell capacity is considerably lower than either femtocell when the mMS is close to the femtocell. This result is due to the smaller bandwidth assigned to the macrocell, and the increasing interference when the mMS approaches each femtocell.

FIGS. 11(a)-11(c) illustrate respectively the capacities of mMS at 300 m, 500 m, 800 m from the mBS (i.e., $d_{mBS}$), as a function of the x-coordinate of the mMS. (FIGS. 11(a)-11(c) are simulated under the configuration of FIG. 9). In each of FIGS. 11(a)-11(d), the maximum capacity handoff metrics, the best-RSS handoff metrics and the CSG capacity are included for comparison. When the mBS is closer to the femtocells, as in FIG. 11(a), the CSG capacity of the mMS improves due to better signal quality. At the same time, there is only minimal gain with capacity-maximizing cell selection due to stronger interference from the macrocell to the femtocell. Still, FIG. 11(a) shows that even when the signal quality from the mBS is better, the mMS may achieve better capacities by handing-off to Femtocell-2 (at x=20 m) at some locations.

FIGS. 11(b) and 11(c) illustrate results at greater distances between the mBS and the femtocell. A capacity maximizing cell selection yields better capacities as compared to RSS based cell selection. For $d_{mBS}=500$ m, i.e., corresponding to the case of FIG. 11(b), the mMS capacity is significantly better when equation (8) is used compared to the RSS based cell-selection, especially when the mMS is in the vicinity of the femtocells (i.e., at x=0 m and x=20 m). For $N_{f2}=1$, the mMS capacity improves even further, especially when it is closer to fBS-2. When the mBS distance is further increased to $d_{mBS}=800$ m, i.e., corresponding to the case of FIG. 11(c), the RSS from the mBS becomes weaker, and hence the RSS-based and capacity-based metrics give similar results when the mMS is close to the femtocells. Better capacities still result from capacity-maximizing cell selection for regions in the vicinity of the femtocells. In each of FIGS. 11(a) to 11(c), both open-access approaches result in better capacities for the mMS, as compared to the CSG access mode when the mMS is in the vicinity of femtocells.

FIG. 11(d) shows the mean capacity of the mMS over its trajectory of FIG. 9 (i.e., from x=−5 m to 25 m, y=8 m), as a function of $d_{mBS}$ and CSG, RSS or maximum capacity selection under different $N_{f2}$ values (i.e., the number of resource blocks allocated to be used in femtocell fBS-2). As shown in FIG. 11(d) the mean CSG capacity degrades along this trajectory, as the RSS becomes weaker for larger $d_{mBS}$. For very small $d_{mBS}$, all approaches provide roughly the same performance. However, as $d_{mBS}$ increases, capacity-based hand-off starts performing significantly better than the other approaches, especially for smaller $N_{f2}$. For each open access method, there is a $d_{mBS}$ values where the capacity is at a minimum.

For CSG simulations, the system models illustrated in FIGS. 2(a) and 2(b) are used. In each model, the fBS is located at the center of a 15 m by 15 m apartment that has 10 dB wall penetration loss, the mBS is located at either $d_{mBS}=500$ m or $d_{mBS}=1000$ m away, the fMS is located 7 m away from the fBS, and the mMS is located on a line between the fBS and the mBS. Each model allocates $N_m=2$ and $N_f=10$ resource blocks to the macrocell and the femtocell, respectively. For the UL, the mMS and the fMS significantly interfere with each other when the mMS is close to the fBS. For the DL, the power level of the received interference signal at the mMS decreases as the mMS moves away from the fBS towards the mBS. At the same time, the interference signal level at the fMS received from the transmission at the mBS remains constant.

Figure 12A:
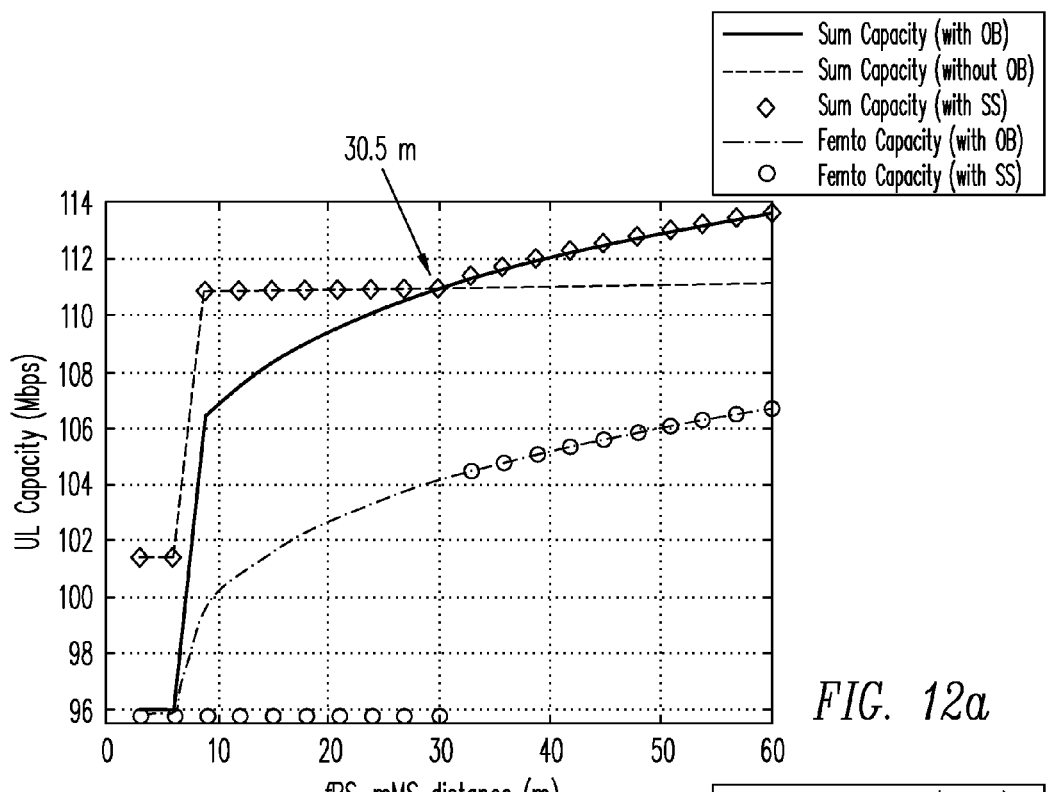
FIGS. 12(a) and 12(b) illustrate the uplink (UL) combined capacity and the UL femtocell capacity for $d_{mBS}$=500 m and $d_{mBS}$=1000 m, respectively, for fBS-mMS distances from 0 m up to 60 m in a CSG implementation with and without spectrum sensing.
Figure 12B:
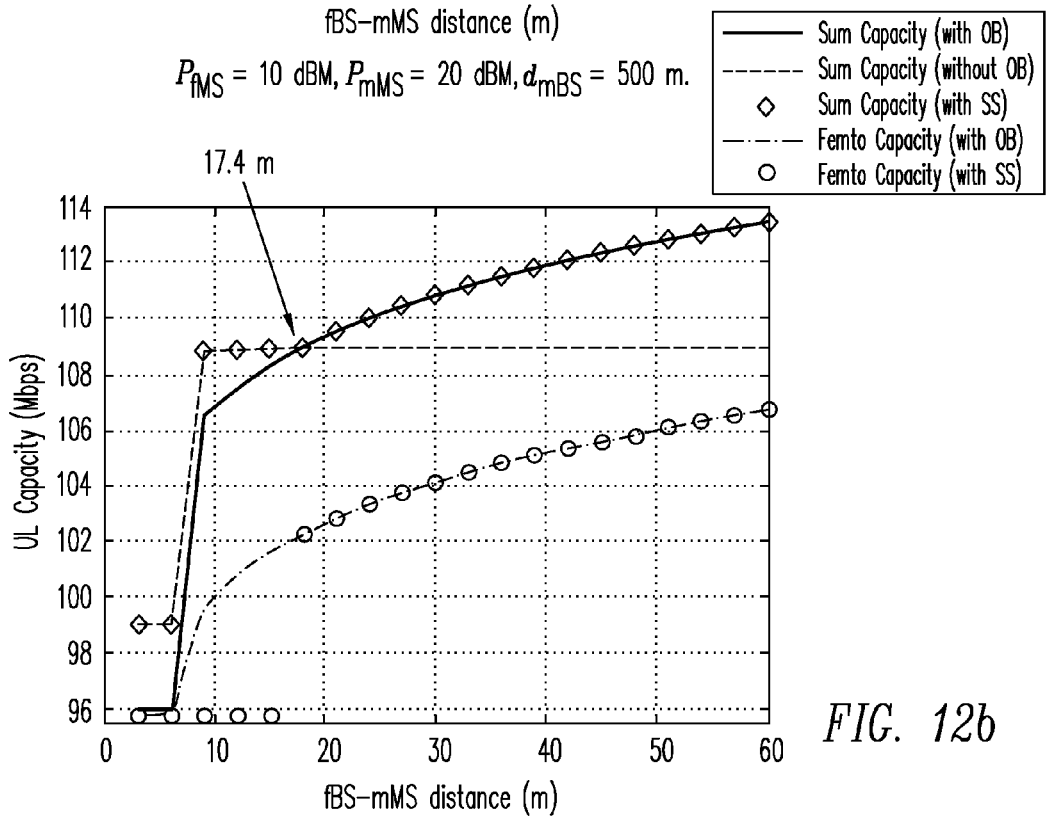
Figure 13A:
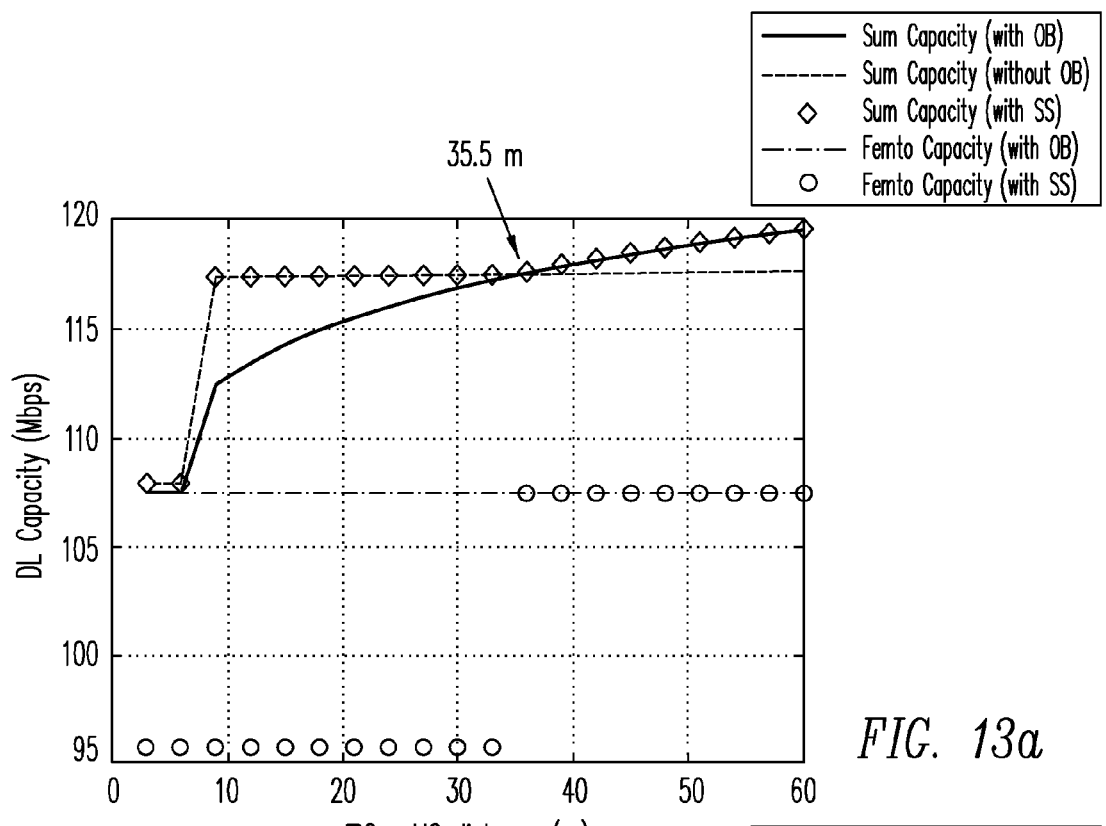
FIG. 13(a) and FIG. 13(b) show the downlink (DL) combined capacity and the femtocell capacity, with and without spectrum sensing (SS).
Figure 13B:
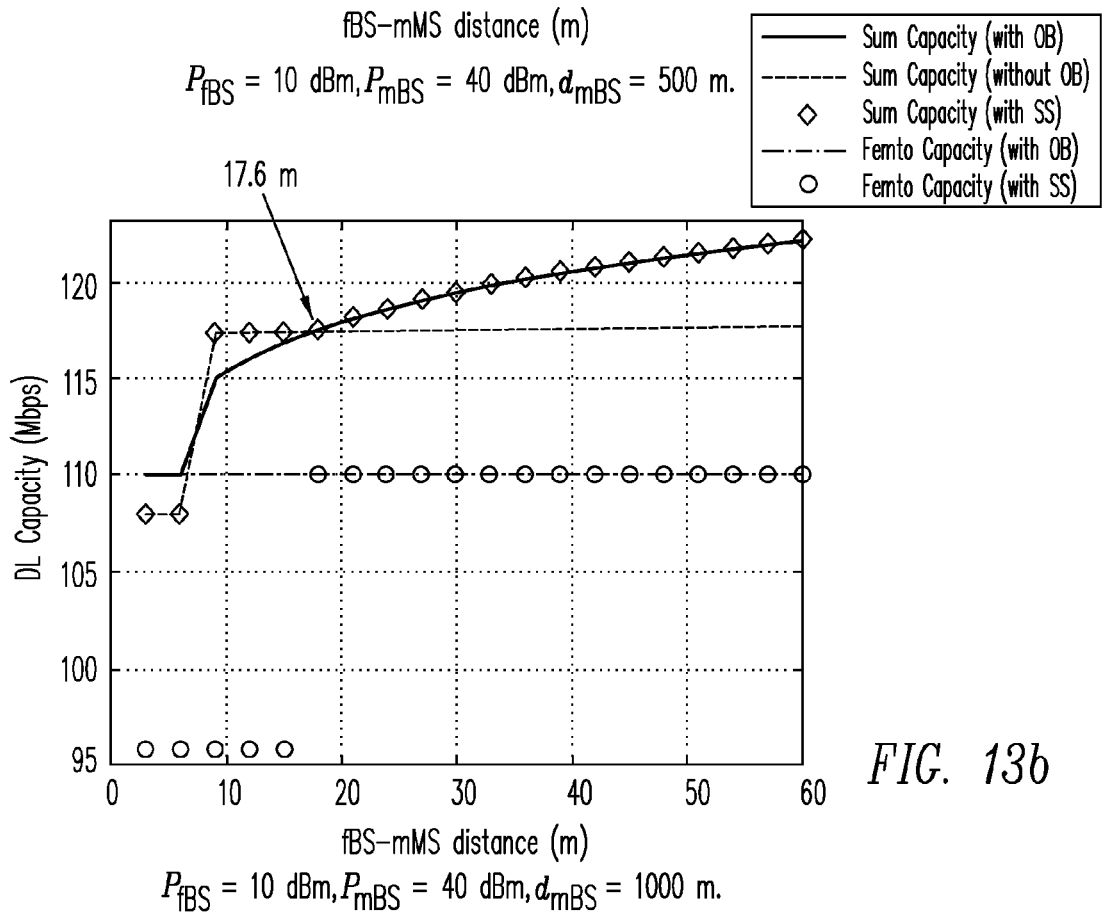

FIGS. 12(a) and 12(b) illustrate the UL combined capacity and the UL femtocell capacity for $d_{mBS}=500$ m and $d_{mBS}=1000$ m, respectively, for fBS-mMS distances from 0 m up to 60 m in a CSG implementation with and without spectrum sensing. When the mMS is relatively close to the fBS, the interference can be detected through perfect spectrum sensing, and the femtocell abstains from reusing the OB. In this case, even though the fMS capacity degrades because of its smaller bandwidth, the combined 1 UL capacity improves because of the reduced interference at the mMS. That is, rather than sharing the OB with interference between the users, the OB is utilized interference-free by the mMS. The improvement in the combined capacity with CSG-SS is more apparent for smaller $d_{mBS}$, since the interference impact on the mBS increases. Both the combined capacity and the femtocell capacity have a sharp increase at around $d_{mBS}$=7.5 m, as a result of the building wall. The $\delta_{fBS-mMS}$ computed using the threshold value in equation (19) is also indicated in each of the FIGS. 12(a) and 12(b). The threshold value matches well with the crossing point of the CSG combined capacity with and without reuse of the OB at the femtocell, respectively FIG. 13(a) and FIG. 13(b) show the DL combined capacity and the femtocell capacity, with and without spectrum sensing (SS). After a cross-over distance $\delta_{fBS-mMS}$ is reached, the reuse of the OB no longer becomes preferable for maximizing the combined capacity. Again, the value $\delta_{fBS-mMS}$ obtained from equation (23) matches well with the crossing point of CSG combined capacity with and without reuse of the OB at the femtocell. The combined capacity improvement results from using CSG-SS is larger when the mBS is close to the femtocell.

The detailed description above is provided to illustrate the specific embodiments of the present invention and is not intended to be limitation. Numerous variations and modifications within the scope of the invention are possible. The present invention is set forth in the following claims.

We claim:

1. In a macrocell system including one or more candidate femtocell networks and a macrocell mobile station, a method comprising:
    receiving from a femtocell base station of each femtocell network, information regarding available bandwidth for femtocell mobile stations associated with the femtocell base station;
    measuring a signal-interference-to-noise ratio (SINR) at the macrocell mobile station relative to the macrocell network and each femtocell network;
    calculating the capacity available to the macrocell mobile station in each of candidate femtocell networks based upon the measured SINRs and the received information regarding the available bandwidths; and
    when the SINR exceeds a predetermined threshold, selecting a network from the candidate femtocell networks that has the greatest capacity available to the macrocell mobile station for a hand-off of the macrocell mobile station to the selected network.

2. The method of claim 1, wherein the macrocell network has a greater average transmission power than each of the co-located networks.

3. The method of claim 1, wherein the hand-off is not triggered unless the capacity available to the macrocell mobile station after the handoff exceeds the capacity available to the macrocell mobile station before the hand-off by a predetermined amount.

4. The method of claim 1, wherein the hand-off is not triggered unless the capacity available to the macrocell mobile station averaged over a predetermined period time after the handoff exceeds the capacity available to the macrocell mobile station before the hand-off by a predetermined amount.

5. The method of claim 1, wherein the information regarding available bandwidth is provided in broadcast by the femtocell networks.

6. The method of claim 1, wherein the information regarding available bandwidth is provided by each femtocell network upon receiving a request.

7. The method of claim 6, wherein the macrocell mobile station is associated with a serving base station of the macrocell network prior to the request, and wherein the macrocell mobile station detects an SINR relative to one of the femtocell networks to be exceeding an SINR relative to the serving base station by a predetermined amount.

8. The method of claim 1, wherein the selecting step is carried out by a base station of the macrocell network.

9. The method of claim 1, wherein the selecting step is carried out by the macrocell mobile station.

10. The method of claim 1, further comprising the macrocell mobile station releasing an association with a macrocell base station prior to handing off to the selected femtocell network.

11. The method of claim 1, further comprising the macrocell mobile station releasing an association with a macrocell base station after handing off to the selected femtocell network.

12. The method of claim 1 wherein the information regarding available bandwidth comprises a number of user associated with each femtocell network.

13. The method of claim 1, wherein a base station for the larger macrocell network receives the information regarding available bandwidth from the femtocell networks over backhaul network connections.

14. The method of claim 1, wherein the capacity available to the macrocell mobile station after the hand-off takes into account the number of femtocell mobile stations already associated with the selected femtocell network.

15. The method of claim 1, wherein the capacity available to the macrocell mobile station after the hand-off takes into account the quality of the signal received from a base station of each femtocell network.

16. The method of claim 1, wherein the femtocell networks operate under an open-access mode.

17. The method of claim 1, wherein a fairness metric is improved as a result of the hand-off.

* * * * *